No. 720,508. PATENTED FEB. 10, 1903.
T. F. & T. S. WALKER.
ELECTRICAL SHIP'S LOG APPARATUS.
APPLICATION FILED JAN. 25, 1902.
NO MODEL. 7 SHEETS—SHEET 1.

Figure 1:
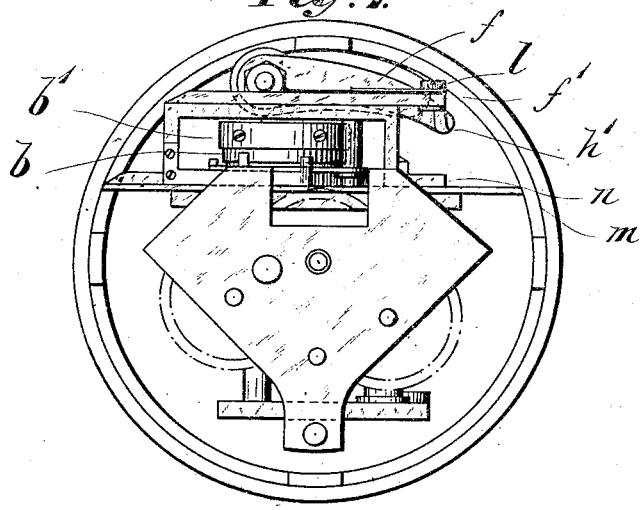

No. 720,508. PATENTED FEB. 10, 1903.
T. F. & T. S. WALKER.
ELECTRICAL SHIP'S LOG APPARATUS.
APPLICATION FILED JAN. 25, 1902.
NO MODEL. 7 SHEETS—SHEET 2.
Fig. 1.ᵃ
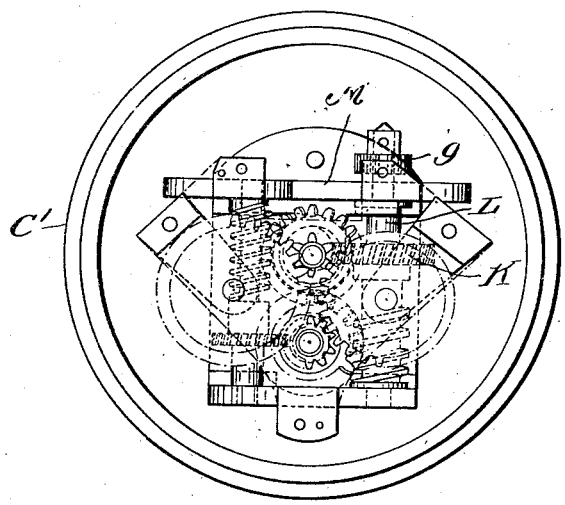
Fig. 1.ᵇ
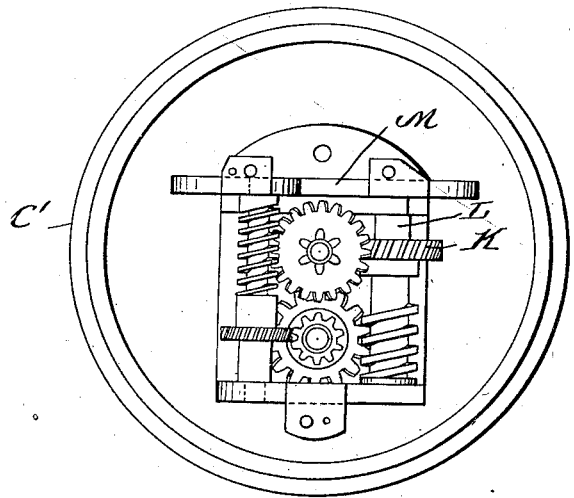
Witnesses:
N. L. Bogan
C. D. Kesler
Inventors
Thomas F. Walker
Thomas S. Walker
By James L. Norris
Atty.

No. 720,508. PATENTED FEB. 10, 1903.
T. F. & T. S. WALKER.
ELECTRICAL SHIP'S LOG APPARATUS.
APPLICATION FILED JAN. 25, 1902.
NO MODEL. 7 SHEETS—SHEET 3.
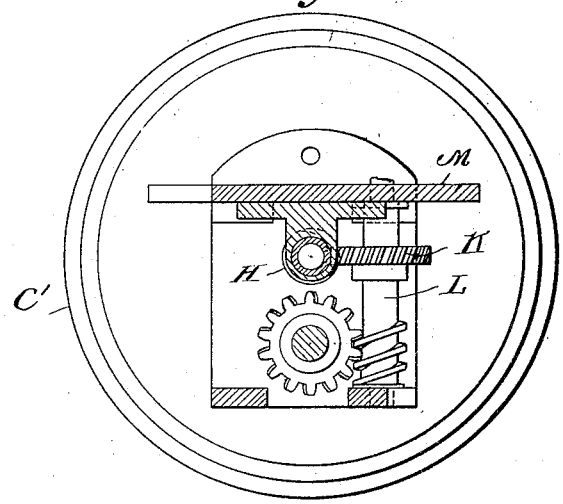
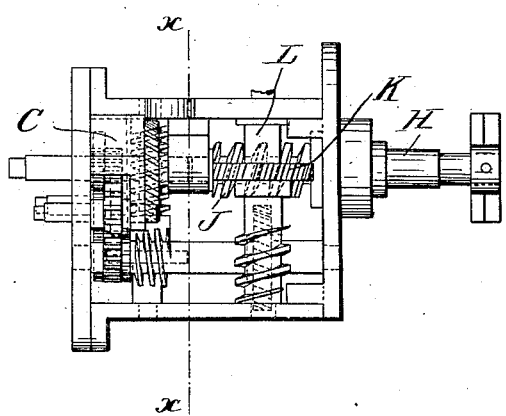

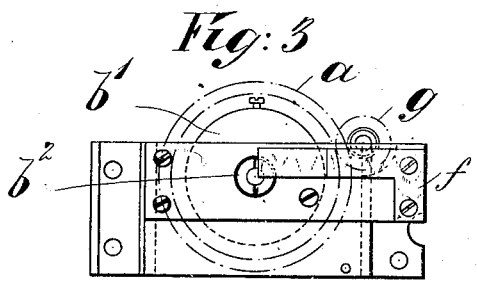
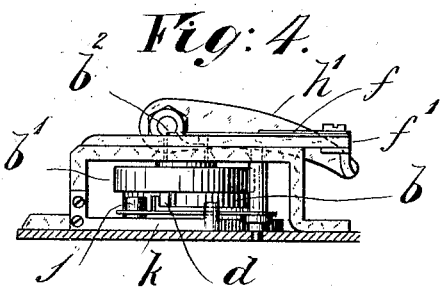
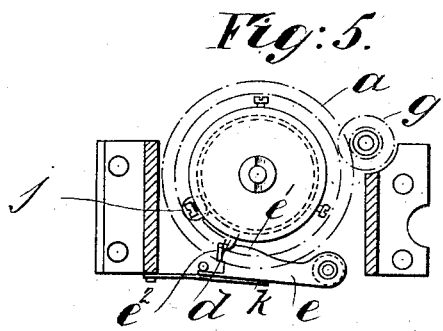
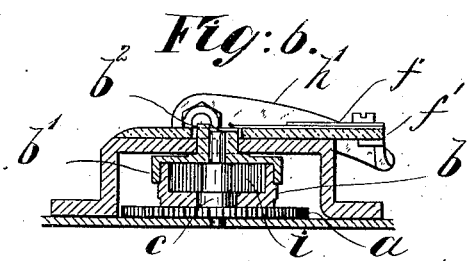
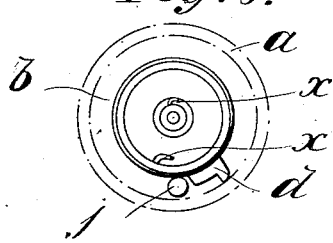
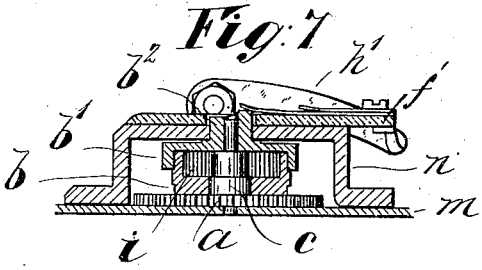
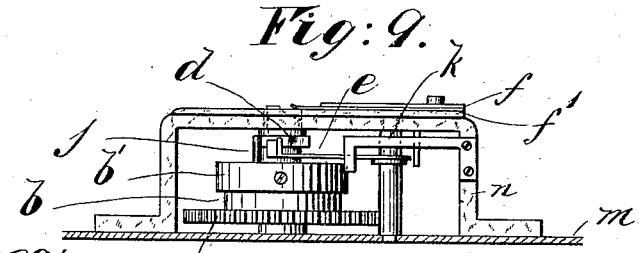

No. 720,508. PATENTED FEB. 10, 1903.
T. F. & T. S. WALKER.
ELECTRICAL SHIP'S LOG APPARATUS.
APPLICATION FILED JAN. 25, 1902.

NO MODEL. 7 SHEETS—SHEET 5.

Witnesses
Inventors
Thomas F. Walker
Thomas S. Walker
By James L. Norris
Atty

No. 720,508. PATENTED FEB. 10, 1903.
T. F. & T. S. WALKER.
ELECTRICAL SHIP'S LOG APPARATUS.
APPLICATION FILED JAN. 25, 1902.
NO MODEL. 7 SHEETS—SHEET 7.
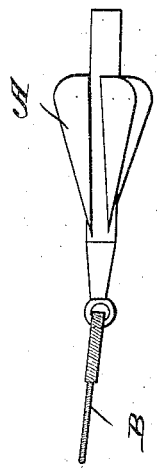
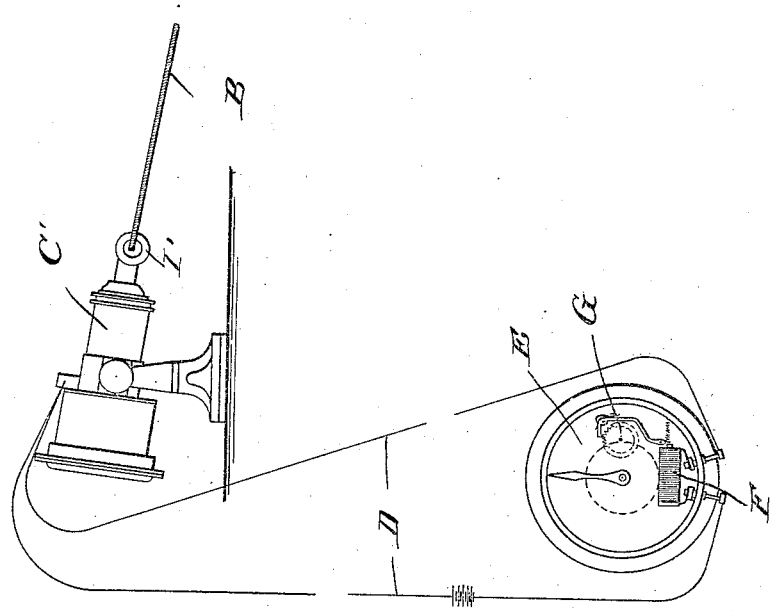
Witnesses:
N. L. Bogan
C. D. Kesler
Inventors
Thomas F. Walker
Thomas S. Walker
By James L. Norris
Atty

UNITED STATES PATENT OFFICE.

THOMAS FERDINAND WALKER AND THOMAS SYDNEY WALKER, OF BIRMINGHAM, ENGLAND.

ELECTRICAL SHIP'S-LOG APPARATUS.

SPECIFICATION forming part of Letters Patent No. 720,508, dated February 10, 1903.

Application filed January 25, 1902. Serial No. 91,257. (No model.)

*To all whom it may concern:*

Be it known that we, THOMAS FERDINAND WALKER and THOMAS SYDNEY WALKER, subjects of the King of Great Britain, residing at 58 Oxford street, Birmingham, in the county of Warwick, England, both of the firm of Thomas Walker & Son, engineers, have invented certain new and useful Improvements in or Relating to Electrical Ship's-Log Apparatus, of which the following is a specification.

These improvements have reference to ship's-log apparatus of the kind described in patent granted to us on the 3d day of June, 1902, No. 701,651. In the apparatus disclosed in the said Patent No. 701,651 there is a barrel inclosing a spring, which is wound up by a continuously-revolving wheel and axis by the rotation derived from parts which are caused to rotate originally by the rotation of a winged propeller drawn through the water in well-understood fashion. Such barrel is there shown provided with an external peripheral projection which for a momentary period closes an electrical circuit for the purpose therein described. According to the arrangement of our present invention as herein shown instead of such projection on the barrel we form the lid, cover, or equivalent part of the barrel for the spring into or connect it into operative unity with a sleeve which projects through or beyond an ebonite or insulating plate or piece affixed to the frame, the said plate serving to support and insulate a contact-spring. This sleeve is cut away on one side or is so formed that in one position of rotation of the barrel or its equivalent when the trigger is released the sleeve revolves and a projecting part thereof slides under the contact-spring and completes the circuit.

Instead of the arrangement already described the barrel may be replaced by any suitable spring-retaining means that will keep the parts in proper relation to enable the spring connection to work correctly. This spring-retaining means may be given to it a continuous rotative movement, while its axis or the axis of the wheel in connection with the spring-retainer may be the intermittently-rotative member to bring about the periodic circuit-closure, and in such case part of this axis will be suitably shaped or be provided with a suitably-shaped contacting part.

Figure 2:
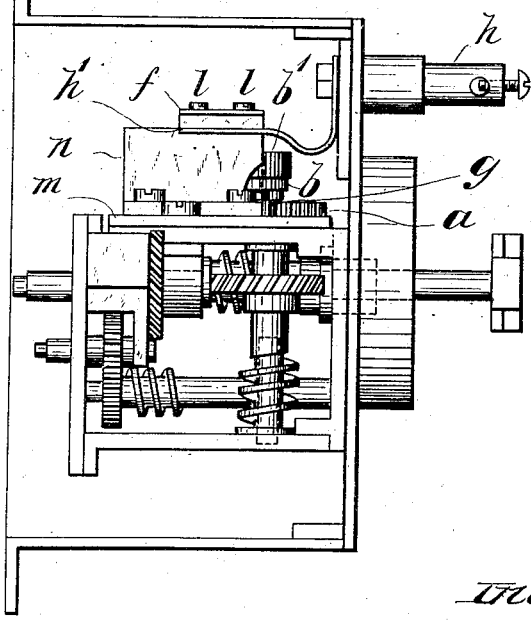
Figure 10:
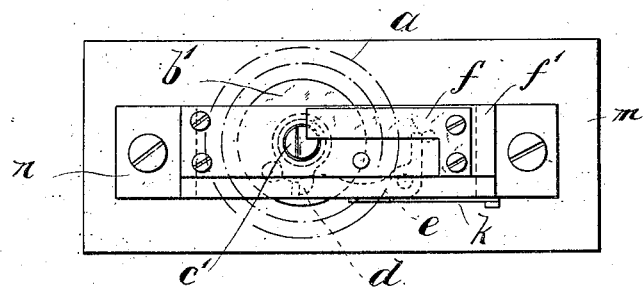
Figure 11:
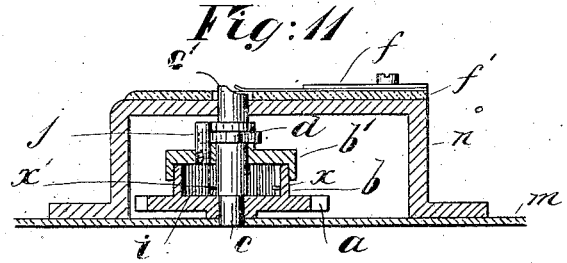
Figure 12:
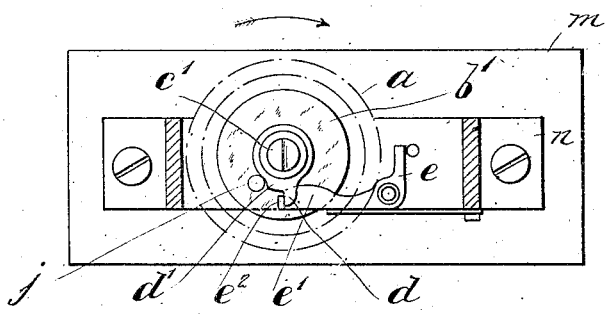
Figure 13:
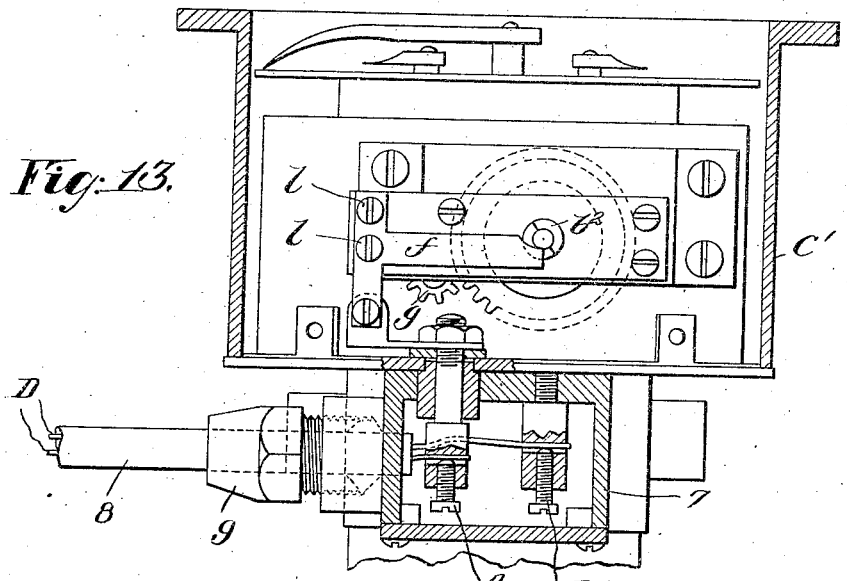
Figure 14:
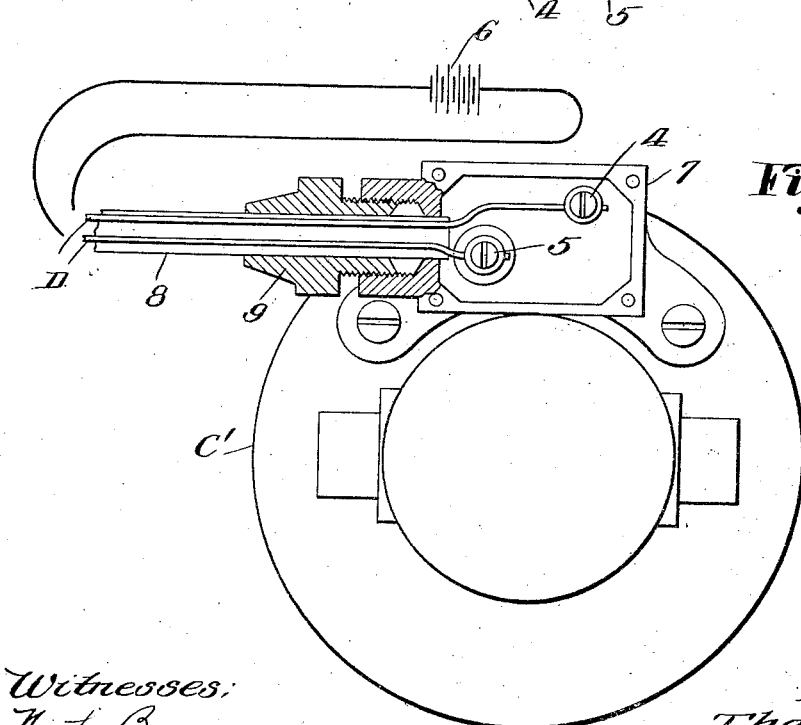

Figure 1 is a front elevation of a log register-case fitted with our improved electrical apparatus with the flange of the register-case removed. Fig. 1$^a$ is a front elevation of the log-register without the electrical apparatus, showing more clearly the wheelwork mechanism. Fig. 1$^b$ is a like view with a portion of the gears removed. Fig. 1$^c$ is a sectional elevation of the log-register on the line $x$ $x$ of Fig. 1$^d$. Fig. 1$^d$ is a side elevation of the log-register. Fig. 2 is an edge view of Fig. 1, showing the actuating-wheelwork. Fig. 3 is a plan view of one form of our apparatus constructed according to our invention. Fig. 4 is a front view of Fig. 3. Fig. 5 is a plan view similar to Fig. 3 with casing broken away to show the trigger and barrel more clearly. Fig. 6 is a front sectional elevation with the electrical circuit open. Fig. 7 is a front sectional elevation showing the electrical circuit closed. Fig. 8 is a plan view of barrel with cap and spring removed. Fig. 9 is a modification shown by front elevation. Fig. 10 is a plan view of Fig. 9. Fig. 11 is a sectional elevation of Figs. 9 and 10. Fig. 12 is a plan view of Fig. 9, being partly in section, so as to show the barrel and trigger more clearly. Fig. 13 is a plan, partly in section, of the electrical circuit-forming mechanism. Fig. 14 is a sectional side elevation thereof; and Fig. 15 is a view showing the log connected to the rotator by means of a flexible connection, the latter broken in two, and also showing the register mechanism connected with the log.

We employ a rotator A of usual description, caused to rotate by resistance to its being dragged through the water, and its rotations are transmitted by a flexible or other connection B to wheelwork of substantially usual description C, which may be such as is shown in Figs. 1$^a$, 1$^b$, 1$^c$, 1$^d$, and 2, by which mechanically these motions are indicated by usual pointers moving relatively to dials bearing ordinary indications of distance—such as one mile, one hundred miles, and one thousand miles dials, with subsidiary divisions—and from the primary spindle or any convenient part of this registering-wheelwork the rotatory motion is transmitted by a pinion $g$ to a toothed wheel $a$, on the axis of which wheel is mounted a barrel $b$, containing a coiled spring $i$, Fig. 6, said spring being attached to the axis $c$ and the barrel $b$ by connections $x$ and $x'$, as shown in Fig. 8. Projecting from the periphery of the barrel is a stop $d$, which when in its resting position is kept in engagement with the detent $e^2$ of the trigger $e$ by the tension of a spring $i$ applied in the barrel $b$.

The extension $b^2$ of the cover $b'$ of the barrel $b$ constitutes the electrical contact-piece, and this piece contacts with a spring circuit-closer $f$, mounted on an insulating-plate $f'$, through which, by means of the screws $l\ l$, Figs. 1 and 2, the said circuit-closer is attached to an extension $h'$ of an insulated terminal $h$, the framework of the mechanism and the rotating contact-piece being permanently in the electric circuit, by which means the electric circuit is completed, and the electric current is conveyed to a point or, it may be, to a plurality of points (not shown) where indications of the movements of the rotator through the mechanism are made on other dials.

The operation of the arrangement of the apparatus shown by Figs. 1 to 8 is as follows: The stop $d$ on the barrel $b$ under the tensional strain of the spring $i$ tends to keep in contact with the rear of the stud $j$ on the toothed wheel $a$, Fig. 8. This stop $d$ is, as shown, so shaped that when the toothed wheel $a$ is rotated by usual mechanism interposed between it and the rotator in the water and the stud $j$ is carried past the inclined part $e'$ of the trigger $e$, causing the trigger to successively rise and fall, there is sufficient distance between the stud $j$ and the stop $d$ for the detent $e^2$ on the trigger $e$ to resume its normal position in time to engage with the stop $d$, and thereby arrest the movement of the barrel $b$ and cap $b'$. The spring $k$ keeps the trigger in its engaged position. The toothed wheel $a$ on the completion of its revolution again brings the stud $j$ against the inclined portion $e'$ of the trigger $e$, tripping said trigger and releasing the stop $d$ on the barrel, whereupon the released barrel $b$, with the cap $b'$ and extension $b^2$, flies around on its axis almost a complete revolution until the projection $d$ is arrested by the rear of the stud $j$. This movement causes the contact-piece $b^2$, here shown as forming an extension of the cap $b'$, to pass underneath the spring circuit-closer $f$, thus insuring certainty of electrical contact between $b^2$, $f$, and $h$, thereby closing the electric circuit D and transmitting an electric impulse to a registering apparatus E in the circuit D.

The registering apparatus E may be actuated by the transmitted electric impulse through the medium of an electromagnet F, working a make-and-break action with ratchet and pawl G or any of the well-known methods by which wheelwork is moved by an alternating push-and-pull movement.

The improved construction insures that the duration of contact shall be reliably constant at all speeds and capable of regulation by the tension given to the spring $i$, located inside the barrel $b$ and modified by the extent of the rubbing-surface of the part $b^2$.

The reference character H denotes the actuating-spindle attached to and operated by the flexible connection B through the operation of the rotator A. The spindle H is attached to the flexible connection B, as at I'. The spindle H is provided with a worm J, meshing with the pinion K, carried by the primary spindle L of the wheelwork. The operation of the spindle L through the medium of the pinion K actuates the wheelwork C. The spindle L also carries at one end the pinion $g$, hereinbefore referred to.

The reference character M denotes a supporting-plate carrying the electrical circuit-forming mechanism hereinbefore described and which is arranged within the casing C', as well as the wheelwork C.

The reference-numerals 4 5 denote the binding-posts for the wires forming the circuit D, and 6 denotes a battery or other source of electrical supply.

The reference-numeral 7 denotes the terminal-box, in which are arranged the binding-posts 4 5, and is, as shown, attached to the casing C'. The wires of the circuit D extend through a sleeve 8, connected by the gland 9 to the box 7.

Figs. 9, 10, 11, and 12 show a slight modification in the arrangement of the parts of the improved apparatus, throughout which like letters indicate like parts, as in Figs. 1 to 8. In this modification the positions of some of the parts are transposed. The spindle $c$, carrying the contact projection $c'$ for contacting with the circuit-closer $f$, is mounted at its opposite ends in bearings formed in the base-plate $m$ and the frame $n$, respectively. This spindle $c$, while forming an axis around which the toothed wheel $a$, the barrel $b$, and the cover $b'$ rotate, is not connected to the said barrel or wheel except by means of the coiled spring $i$. The barrel $b$ and the wheel $a$ are, as here shown, formed as one piece. Upon the spindle $c$ is the enlargement $d'$, carrying the stop $d$. The wheel $a$ in its rotative movement in a direction shown by the arrow, Fig. 12, winds up the spring $i$ and carries around with it the barrel $b$ and stop $j$, mounted on its cover $b'$, and as soon as the stop $j$ in its rotation arrives at a point when it contacts with an inclined surface $e'$ of the trigger $e$ said stop $j$ presses outwardly that trigger, disengaging its end or detent portion $e^2$ from engagement with the stop $d$, which stop $d$ had until such release been held from rotation thereby. The spindle $c$ now released flies around, makes a momentary electrical contact between the parts $c'$ and $f$, and as rapidly breaks that contact, and the enlargement $d'$ thereon coming into contact with the rear surface of the stop $j$ is prevented thereby from again resuming its locked position with the trigger $e$ until that stop $j$ has rotated a further distance into the position shown by Fig. 12.

The electrical energy referred to may be derived from any suitable source; but we have found a dry battery of two or more cells to answer the purpose satisfactorily.

We may employ a registering-log of usual or convenient construction in the water and convey the indications of the rotations of the rotator to a point or to various points on the ship by means of electrical energy with the aid of the current-controlling parts described, suitable dials and pointers indicating the distance traveled by the rotations of the parts, or when using a plain rotator the usual clockwork and dial-work on the taffrail may be replaced by the primary spindle and gearing actuating our apparatus and the revolutions transmitted by electrical energy, with the aid of the current-controlling parts already described, to wheel and dial mechanism, where the rotations will be indicated.

In order to insure absence of contact, except at the proper moment, between the members of the make-and-break electrical contact which serve to control the passage of current and also in order to insure a substantial area of contact-surface, we have devised the plan described of locating the electrical contact-surface endwise of its rotative axis, and we so position the resilient circuit-closer coöperating therewith that the approach and recession relatively of those parts takes place in the direction of the length of the support or axis and the electrical contact is made in a plane at right angles to the axial line of rotation, whereas in the case of an electrical contact-surface mounted peripherically on a drum or such like body having an intermittent rotative motion imparted to it, the rubbing-contact being obtained by placing a resilient strip in the path of that contact, results in a mere lineal contact across the breadth of the conductive resilient strip of no substantial area.

Although in the construction chosen by us for illustration we have shown a barrel to inclose the intermediate coiled spring and to serve at the same time as a means of connection between the constantly-rotating motor mechanism actuated by the revolutions of the log-rotator and an intermittently-rotating contact-maker, it will be readily understood that although the use of an inclosing barrel as dirt-excluder and protection is a convenience it is not an essential necessity, the essential requirement being the connection of one end of the coiled intermediate spring to the rotator-impelled motor mechanism and of the opposite end of that spring to the intermittently-rotating contact-maker.

Having now particularly described and ascertained the nature of our said invention and in what manner the same is to be performed, we declare that what we claim is—

1. In an electrical ship's-log mechanism, the combination of a continuously-rotating member, an impelled member rotating at intervals, an intermedially-connecting spring, a detent device acting to intermittently restrain the rotative movement normally imparted by the continuously-rotating member to the impelled member, and a making-and-breaking electrical contact device forming part of the said impelled member and having a rotative contacting surface positioned in a plane at right angles to the axial line of rotation of the intermittently-impelled member.

2. In an electrical ship's-log mechanism, a continuously-rotating member, a circuit making and breaking member rotating at intervals and arranged concentrically with the said continuously-rotating member and having an axially-arranged contact-surface, and a spring connection between said members adapted to impart movement to the said circuit making and breaking member, substantially as herein shown and described.

In testimony whereof we have hereunto set our hands in presence of two subscribing witnesses.

THOMAS FERDINAND WALKER.
THOMAS SYDNEY WALKER.

Witnesses:
HUME CHANCELLOR PINSENT,
FRANCIS MARTIN TOMKINSON.